United States Patent [19]

Martin

[11] Patent Number: 4,488,143

[45] Date of Patent: Dec. 11, 1984

[54] FIXED RATE RUN LENGTH LIMITED (RLL) CODE STRING GENERATION USING LENGTH ORIENTED ARITHMETIC CODE DATA STRING EXPANSION AND DATA STRING RECOVERY USING ARITHMETIC CODE COMPRESSION OF RLL CODE STRINGS

[75] Inventor: George N. Martin, Winchester, England

[73] Assignee: International Business Machines Corporation, Armonk, N.Y.

[21] Appl. No.: 393,273

[22] Filed: Jun. 29, 1982

[30] Foreign Application Priority Data

Aug. 7, 1981 [EP] European Pat. Off. ............ 81303614

[51] Int. Cl.³ ............................................. H03K 13/00
[52] U.S. Cl. ............................................. 340/347 DD
[58] Field of Search ................ 340/347 DD; 235/310; 364/200, 900; 360/40–44

[56] References Cited

U.S. PATENT DOCUMENTS 3,689,899  9/1972  Franaszek .................... 340/347 DD
4,122,440  10/1978  Langdon ...................... 340/347 DD

OTHER PUBLICATIONS

Guazzo, "IEEE Transactions on Information Theory," vol. IT-26, No. 1, Jan. 1980, pp. 15–25.
Franaszek, "IBM Journal of Research & Development," Jul. 1970, pp. 376–383.
Rissanen, "IBM Journal of Research & Development," vol. 23, No. 2, Mar. 1979, pp. 149–162.

Primary Examiner—Charles D. Miller
Attorney, Agent, or Firm—R. Bruce Brodie

[57] ABSTRACT

A length oriented arithmetic decoder constrained to ONE-TO-ONE map in the data string to run length limited string direction and ONTO map in the run length limited to data string direction through an arithmetic encoder preserves the fixed rate of the RLL string and ensures representability. A finite state machine responsive to the arithmetic decoder output provides the trial augends and shift amounts necessary for the magnitude comparison decoding of the data string treated as if it were arithmetically compressed. A finite state machine is also used with the arithmetic encoder for providing trial augends and shift amounts but is responsive to successive RLL symbols as if it were ordinary source strings. The encoder combines the augends with a predetermined retained portion of the generated data string. The ONTO mapping assures that RLL strings do not map into arithmetic strings which have no RLL string counterparts and which arise out of the nature of recursive arithmetic compression coding while the ONE-TO-ONE mapping assures the existence of an RLL string for each data string.

3 Claims, 8 Drawing Figures

BLOCK DIAGRAM FOR GENERATING CHANNEL STRING

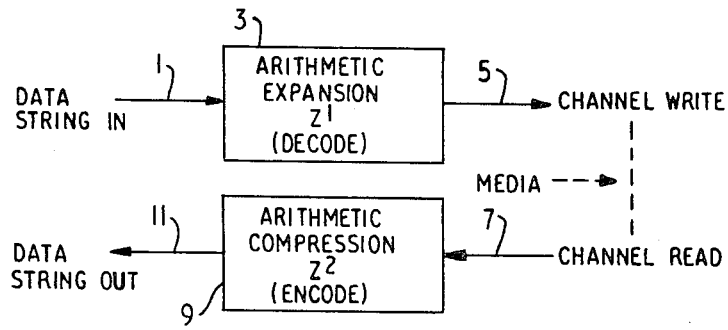
FIG. 1 APPLICATION OF ARITHMETIC CODING TO A CONSTRAINTED CHANNEL
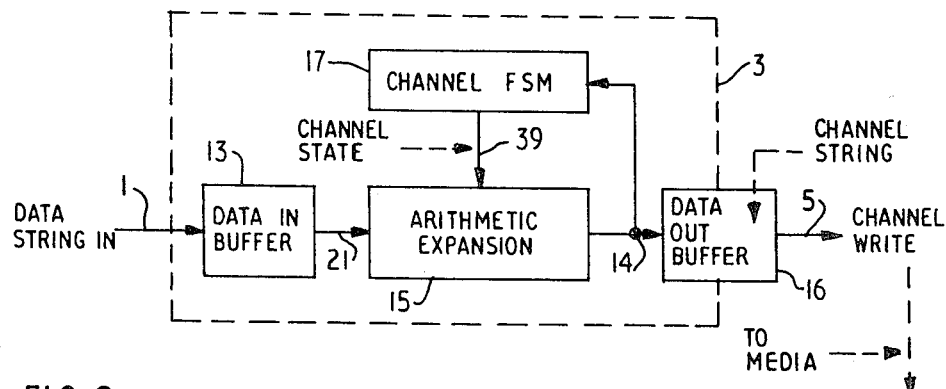
FIG. 2 BLOCK DIAGRAM FOR GENERATING CHANNEL STRING
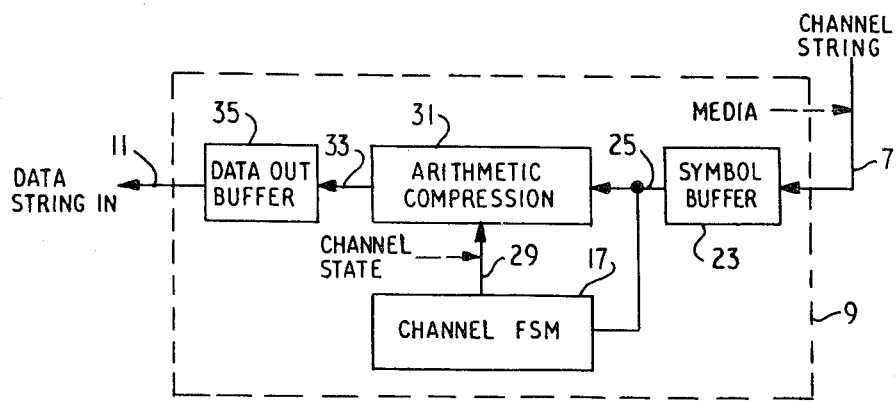
FIG. 3 BLOCK DIAGRAM DATA STRING RECOVERY

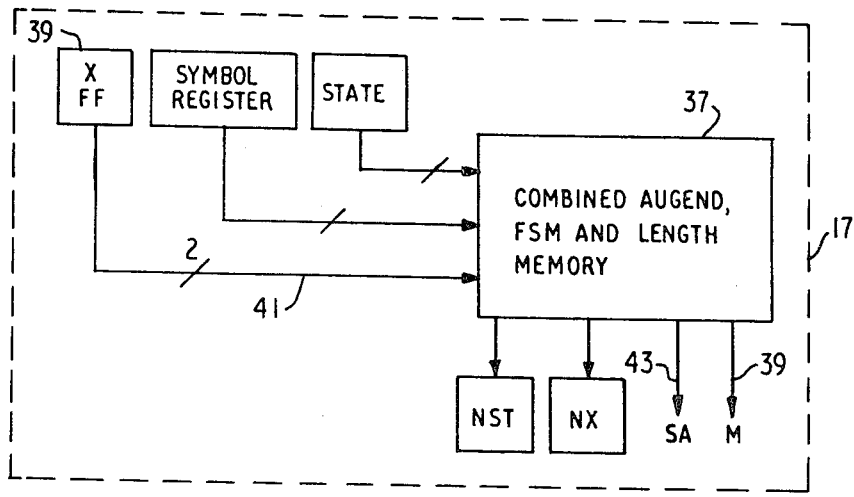
FIG. 4  AUGEND MEMORY WITH CHANNEL FSM AND LENGTH RECURSION
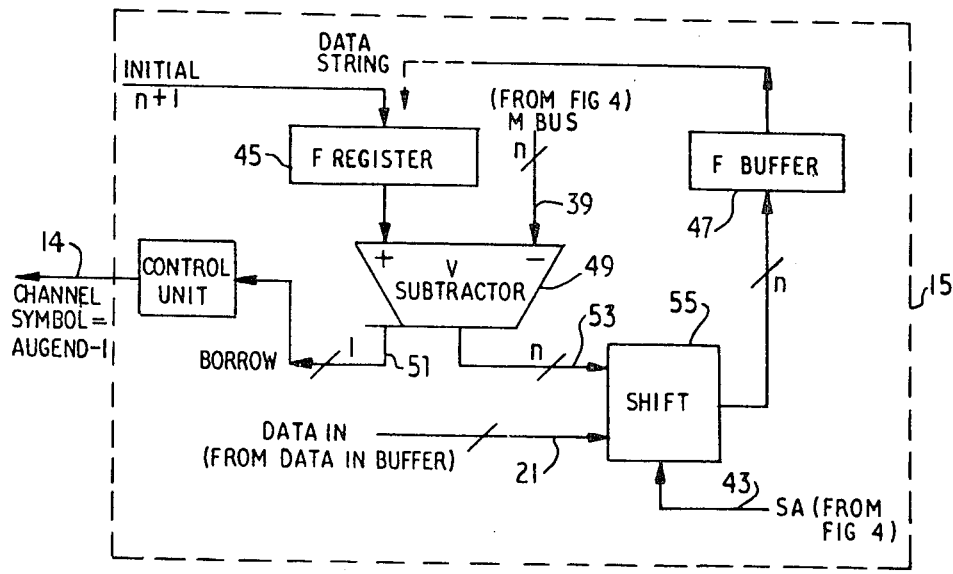
FIG. 5  DATA FLOW FOR CHANNEL STRING GENERATION

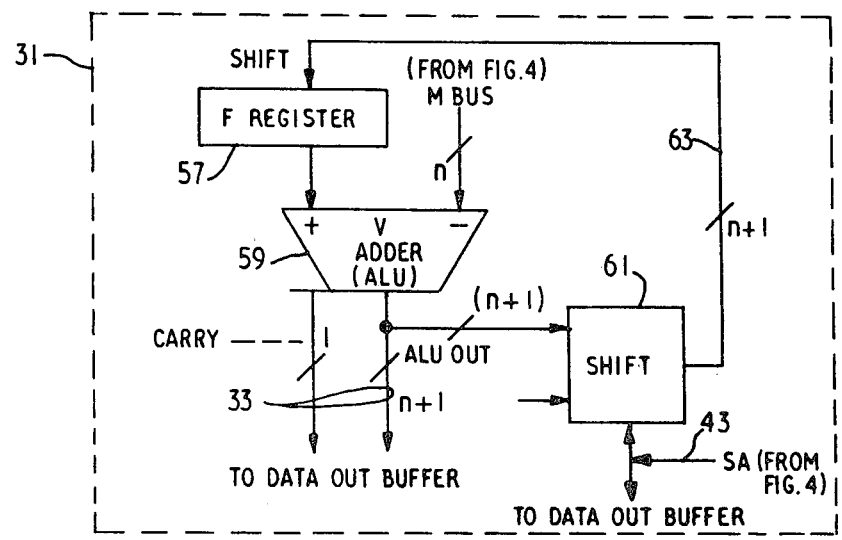
FIG. 6  DATA FLOW FOR DATA STRING RECOVERY
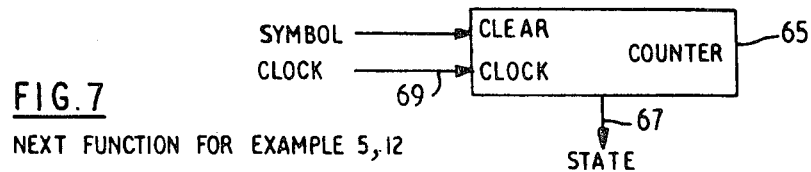
FIG. 7  NEXT FUNCTION FOR EXAMPLE 5, 12
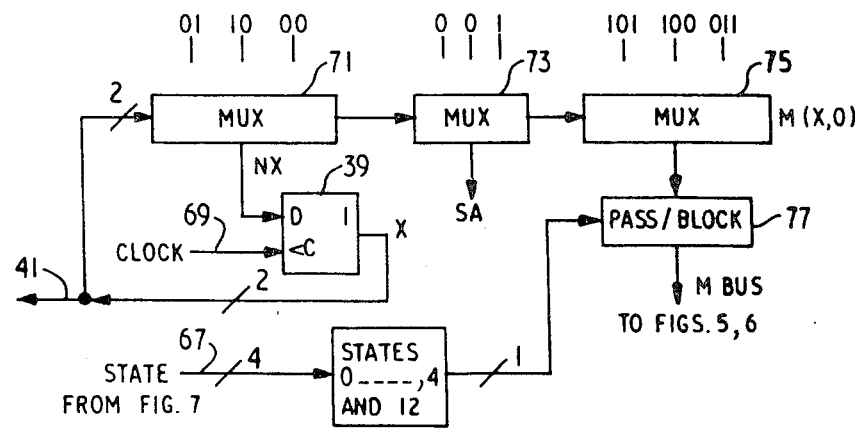
FIG. 8  IMPLEMENTATION OF NEXT x, SHIFT AND AUGEND M

FIXED RATE RUN LENGTH LIMITED (RLL) CODE STRING GENERATION USING LENGTH ORIENTED ARITHMETIC CODE DATA STRING EXPANSION AND DATA STRING RECOVERY USING ARITHMETIC CODE COMPRESSION OF RLL CODE STRINGS

TECHNICAL FIELD

This invention relates to the generation and recovery of strings of symbols constrained according to a finite state machine description and where the symbols have duration parameters.

BACKGROUND ART

Franaszek, U.S. Pat. No. 3,689,899, issued Sept. 5, 1972, described a method for increasing the density with which data could be recorded on disks or which could be reliably transmitted through existing channels by a run length limited coding technique. This technique converts ordinary binary data strings by requiring that each one in a coded bit sequence must be separated from the nearest adjacent one by a number of zeros at least equal to a minimum quantity d in order to ensure freedom from intersymbol interference during recording or transmission but not exceeding a maximum number k which was required for self-clocking purposes. Such codes are referred to as (d,k) RLL codes. The coded information is processed in code groups or code words of variable lengths. The lengths of the encoded words bear a constant ratio (fixed rate) to the respective lengths of their corresponding original data bit strings. Further, Franaszek disclosed in "Sequence State Methods For Run Length Limited Coding", IBM Journal of Research and Development, pp. 376-383, July 1970, that a binary string could be mapped into either a fixed rate or variable rate RLL code using either state dependent or state independent transformations.

Guazzo, "A General Minimum Redundancy Source Coding Algorithm", IEEE Transactions on Information Theory, Vol. IT26, pp. 15-25, January 1980, described the mapping of source strings into a variable rate RLL symbol string using a Huffman decoder. Recovery of the source string was by way of applying the RLL symbol string to a Huffman encoder. In this regard, the Huffman decoder expands the RLL string relative to the data string while the encoder recovers the original string by compression of the RLL string.

The compression of bit strings by using a pair of recursions for arithmetically combining bit pairs of relatively shifted binary finite number strings is described by Rissanen and Langdon in "Arithmetic Coding", IBM Journal of Research and Development, Vol. 23, pp. 149-162, March 1979. One recursion arithmetic combines an increment to a retained portion of the compressed code string, while the second recursion controls the compressed string's length increase. Also, arithmetic codes may be either probability oriented or length oriented. These are respectively described in Langdon, et al., U.S. patent application, Ser. No. 98,285, filed Nov. 28, 1979, and Langdon, et al., U.S. Pat. No. 4,122,440, issued Oct. 24, 1978.

The Langdon, et al., references point out that in arithmetic compression encoding, the current code strings are generated recursively by adding augends to the previous code string which resulted from the encoding of the previous binary source symbol. In contrast, compression decoding involves examining the most significant part of the code string and determining from its magnitude the largest augend not exceeding the numerical value of said code string. This augend is, in turn, subtracted out. The decoded symbol is that source alphabet symbol which corresponds to the subtracted out augend.

According to these references, arithmetic codes order (arrange) the source alphabet $a_1, a_2, \ldots, a_w$, where $a_w$ is the last symbol in the ordering according to a length parameter $l(a)$, where the relative frequency of occurrence $p(a)$ is related to the length parameter according to $$p(a_i) \simeq 2^{-l(a_i)}.$$

In this regard, a length based arithmetic code maps a source string "u" recursively into code strings F(u). Given u and F(u), the encoding of the next symbol "a" means that the source string "u.a" now maps into code string F(u.a). The "length" of code string F(u) is the sum of the length parameters of the individual symbols which comprise string u. The length parameter has an integral part E(u) and a fractional part X(u). The length of F(u) may be represented by length $F(u) = E(u) + X(u)$.

THE INVENTION

The technical problem sought to be solved is that of generating a fixed rate RLL code from a data stream using a recursive process and recovering the original data from said encoded stream also by way of a recursive process. The invention is based upon the critical observation that if a length oriented arithmetic decoder were constrained to ONE-TO-ONE map symbol strings in the data string to RLL string direction and if a counterpart arithmetic encoder were constrained to ONTO map symbol strings in the RLL to data string direction, then such measures would permit recursive code operations and preserve the fixed rate property.

More particularly, the machine implementable method and apparatus according to the invention generates a fixed rate run length limited symbol string u from a data symbol string equivalent of a compressed code string $F(u) = a(1), a(2), \ldots a(i), \ldots a(n)$, characterized by the step of ONE-TO-ONE mapping of each successive data symbol string as a high to low position magnitude order finite number string equivalent of a length oriented arithmetically compressed code stream into an arithmetically decoded and expanded RLL string counterpart. Further, the machine implementable method and apparatus for the recovery of a successive data symbol string equivalent of a compressed code stream $F(u) = a(1), a(2), \ldots a(n)$ from a fixed rate run length limited (RLL) symbol string u is characterized by the step of ONTO mapping of each successive RLL symbol string equivalent of a data string into a length oriented FIFO arithmetically compressed code stream.

Advantageously, the ONE-TO-ONE mapping ensures that all data strings can be represented by RLL strings. Also, the ONTO mapping avoids the unrepresentability of data strings lying within a magnitude gap between data strings created by the arithmetic encoding of adjacent magnitude ordered RLL strings. If the map is not ONTO, then this gap obtains when adjacent magnitude ordered RLL strings u, u+1 of the same length map into a pair of data strings F(u), F(u+1) that have a magnitude gap admitting one or more data strings i such that F(u)<i<F(u+1). Data strings i when applied to the length oriented decoder to be transformed into counterpart RLL strings map to the same string. This RLL string u, for a given continuation length, is always the largest continuation of u permitted by the constraints.

BRIEF DESCRIPTION OF THE DRAWING

FIG. 1 illustrates the code expansion by way of arithmetic decoding of a data string applied to a constrained channel and its inverse.

FIG. 2 is a block diagram for generating the RLL or constrained channel string.

FIG. 3 is a block diagram depicting apparatus for recovering the data string from the constrained channel string.

FIG. 4 illustrates a finite state machine (FSM) depiction of the constrained channel in the form of registers and a table look-up memory.

FIG. 5 shows the logic for arithmetically expanding the data string to form the RLL constrained channel code as indicated in FIG. 2.

FIG. 6 is the logic for recovering the data string by way of arithmetic compression of the RLL constrained channel code depicted in FIG. 3.

FIG. 7 sets out the next state function used in the exemplary (5,12) RLL code.

FIG. 8 indicates a logical implementation of the augend shift amount and next x values.

DESCRIPTION OF THE PREFERRED EMBODIMENT AND INDUSTRIAL APPLICABILITY

Characterization of Constrained Channels

Run length limited coding arises out of the experience in recording digital bit streams of information on serially reusable magnetic media such as DASD and tape. The information processing elements in the recording path are collectively termed the 'recording channel'. Since only well-defined symbol strings are permitted in order to satisfy RLL codes, the recording channel belongs to a class denominated "constrained channels." Corresponding to each symbol "a" in the channel alphabet is a channel duration d(a) measured in channel time units. In this invention, only durations which are integer multiples of a channel time unit are considered. The prior art has characterized the constrained channel by a finite state machine where for at least one state only a proper subset of all possible symbols is allowed. In a so-called (1,3) RLL code, at least one "0" and no more than 3 "0"s must separate the consecutive 1's. The channel alphabet then consists of 0's and 1'each of unit duration. A 4-state finite state machine of states 0, 1, 2, 3, and 4 describe the constraints. Illustratively, state 0 may be entered following symbol 1. The next state function T is shown in Table 1.

TABLE 1

| State | 0 | 1 |
|---|---|---|
| 0 | 1 | — |
| 1 | 2 | 0 |
| 2 | 3 | 0 |
| 3 | — | 0 |

In the Table 1, T(2,0)=3. This means that the next state for state 2 under symbol 0 is state 3.

An alternative model uses a channel symbol parsing technique which incorporates the constraints. In this model, only acceptable channel strings resulting from the concatenation of the following 3 sub-strings 01, 001, and 0001. All finite channel strings conforming to the (1,3) constraint, can be parsed into a concatenation of these three symbols, of respective durations 2, 3, and 4. Channel coding is performed by concatenating substrings from a predetermined collection of allowed channel sub-strings. The selected sub-string depends on a state and on the value of the next sub-string of the data string to be encoded. This result was described by Franaszek, in "On Future Dependent Block Coding for Input Restricted Channels", IBM Journal of Research and Development, Vol. 23, pp. 75–81, January 1980.

Double Recursions and Length Based Arithmetic Codes

As may be recalled, a pair of recursions is used to generate a data stream into a compressed code string. Each term of the compressed code stream F(u.a) is related to the immediate prior value of the code stream F(u) and an augend according to the relation $F(u.a) = F(u) + M(x,a) \times 2^{-E(u)}$. The augend, $M(x,a) \times 2^{-E(u)}$ consists of a fixed precision number $M(x,a)$ and the factor $2^{-E(u)}$ which represents a right shift of $E(u)$ bits. As may be recalled, the length of F(u) is represented by length $F(u) = E(u) + x(u)$ where $E(u)$ is an integer and $x(u)$ is a fraction. The length recursion is processed as two relations, namely, $$x(u \cdot a) = \{x(u) + l(a)\}$$
$$E(u \cdot a) = E(u) + \lfloor x(u) + l(a) \rfloor$$

to obtain the new integer and fractional parts of the length of F(u.a)

$$E(u.a) + x(u.a) = E(u) + l(a)$$

State Dependent Length Based FIFO Arithmetic Code Recursion

Let state conditioning or dependency be used, where "s" denotes the symbol for a typical conditioning state. Now the probabilities and lengths are state dependent, thereby rendering the augend factors also state dependent. In turn, the double recursions code string: $F(u \cdot a) = F(u) + M(s,x,a) \cdot 2^{-E(u)}$
length: $x(u \cdot a) = \{x(u) + l(s,a)\}$
$E(u \cdot a) = (u) + x(u) + l(s,a)$
where $l(s,a) = -\log p(a/s)$

Brief Review of the Length Oriented Arithmetic Compression Encoding Process

The compression encoding process consists of obtaining the augend M from an augend table and adding it to F(u) in the proper bit position. The code string itself can be considered to be the sum of properly shifted augend factors M. Once M(s,x,a) has been added, then F(u.a) can be shifted left by E(u.a)E(u) bit positions so as to realign the code string to receive the next augend in the proper position. The shift amount is the floor of l(s,a)+x(u).

The arithmetic compression encoder must retain each new value of recursion variable x because it enters into the table look-up for M and is also used in the next length recursion. In state dependent coding, the state must also be calculated. Given a symbol and the state, the length would need to be acquired from a table for each state.

Brief Review of the Arithmetic Decoding (Expansion) Process

The reverse process (decoding) recovers the original source string u, given code string F(u). In F(u), the first augend which was added (belonging to the first symbol encoded) represents the largest magnitude because the augend factors belonging to suceeding symbols are relatively right shifted by E(u) bit positions. Therefore, the latest augend corresponding to the possible first symbol equal to or less than F(u) indicates the correct symbol to decode. This augend is subtracted from F(u) and the code string shifted according to E(u.a)E(u). The decoder must also update recursion variable x in the same manner as the encoder does. In state dependent versions of the decoder, use must be made of each decoded source symbol in order to alter the conditioning state.

Conceptual Aspects of the Invention

Refer now to FIG. 1, a data string is applied on path 1 to a length oriented arithmetic decoder 3 which responds to the data string as if it were the high to low position magnitude order bits of an arithmetically compressed stream. The decoder expands the stream into the constrained form required by the (d,k) or other constraints suitable for recording or transmission. On playback, the RLL strings are applied over path 7 to an arithmetic encoder 9. Encoder 9 responds to the bit string on path 7 as if it were an ordinary binary number string to be reduced (compressed) and placed on output path 11. The invention contemplates the proper constraining of the arithmetic decoder and encoder so as to preserve a fixed rate constant length ratio between input and output and ensure that all data strings can be represented by channel strings and all channel strings can be represented by data strings. In this regard, representability is to run length limited coding as the decodability criteria is to compression coding. It is the case that for length based arithmetic codes, that the set of augends satisfying the compression decodability criteria cannot satisfy the run length limited encoding criteria.

Referring now to FIG. 2, there is shown a block diagram for generating the channel string from the data string. In this regard, the data string is viewed as a code string which is arriving at the data in buffer 13 most significant bits first. The mapping of the data strings into counterpart (d,k) RLL string, is accomplished by an arithmetic expansion (arithmetic decoder) 15 in feedback relation with an FSM representing the channel state 17. More particularly, the output of arithmetic expansion 15 is applied to FSM 17 over path 14. The channel state is communicated to the expansion network 15 over path 39. FSM 17 is initialized to its first state and the arithmetic expansion unit 15 acts upon the data and the channel state to generate a string of RLL symbols. Data out buffer 16 can parse the RLL string to convert the symbols to the requirements of the particular recording channel path 5. The channel symbols emitted by arithmetic expansion unit 15 are fed to FSM 17. FSM 17, in turn, acts upon the new symbol and the current state to furnish the arithmetic expansion unit with the next state over path 39. Included within the arithmetic expansion unit are means of performing the special double recursions prescribed for arithmetic decoding. Thus, unit 15 is capable of updating internal variables, determining augend factors, shifting in data bits as needed, and shifting out a channel symbol at the completion of a decoding recursion.

Referring now to FIG. 3, there is shown a general block diagram for data string recovery from a (d,k) RLL symbol string from path 7. A local buffer 23 converts the channel phenomenon to be parsed or unparsed so as to be understood by the arithmetic compression unit 31. The RLL symbols are simultaneously applied to FSM 17 and compressor 31 over path 25. FSM 17 supplies a state to compressor 31 over path 29. The shortened output of compressor 31 is applied to a data out buffer 35 over path 33.

Conceptual Aspects of a (5,12) RLL Code Using the Invention

From the finite state machine describing the channel constraints, it is necessary to determine the Shannon maximum data rate log W. Since a fixed rate requires that N data bits be transformed into C RLL channel bits, then the ratio of the integers N and C are selected such that (N/C)<log W and that retained fraction x exhibit C possible values: 0, 1/C, 2/C, . . . , (C1)/C.

For a channel FSM having states 0, 1, . . . , 12, the symbol 0 is allowed in any state but 13. This may be expressed as $$0 \leq i \leq 11 : T(i,0) = 1.$$

Symbol 1 is not allowed in states 0 through 4. When symbol 1 is allowed, the next state is always state 0. This may be expressed as $$4 \leq i \leq 12 : T(i,1) = 0.$$

The augend factors M must be determined which satisfy a self-consistency test. In order to satisfy the test, the augends M must be close to a predetermined value defined by the relation $$M(j,x,a) = \text{Round}[2^n \cdot (B_j/B_o) 2^{-x} \cdot P(j,a)].$$

The triple $(j,x,a_k)$ identifying each augend factor M consists of channel state j, retained fraction x, and channel symbol $a_k$. Interestingly, in the above equation, it is assumed state 0 to be the initial state. This makes $2^n/B_o$ serve as a scale factor. Since one of the values B can be chosen arbitrarily, $B_o$ can be chosen as unity. This results in the augend factors M being in bit integers. Further, $P(j,a_k)$ is a cumulative Shannon probability, that is the sum of Shannon probabilities $$P(j,a_n) \text{ for } M < k,$$

where $P(j,a_1) = 0$.

The self-consistency test involves the inequality $$M(j,s,a+1) - M(j,x,a) \leq M(T(j,a), \{x + l(a) \cdot N/C\}, a_w + 1) \cdot 2^{-x + l(a) \cdot N/C}$$

The factor $$M(j,s,a_w+1) = \text{Round}[2^n \cdot (B_j/B_o) \cdot 2^x \cdot 1.000]$$

where $P(j,a_w+1)$ is said equal to 1.000.

The optimization problem is to determine the values for M which satisfy the self-consistency and equality. A typical design computation would yield the following values for retained fraction x and augend M

TABLE 2

| S | M |
|---|---|
| 0 | 5 |
| ⅓ | 4 |
| ⅔ | 3 |

Table Based Finite State Machine for Implementing (d,k) RLL Codes

The design of a finite state machine has been described for example by Clare, *Designing Logic Systems Using State Machines*, McGraw Hill Book Co., New York, 1973; and Fletcher, *An Engineering Approach to Digital Design*, Prentice Hall, Englewood Cliffs, New Jersey, 1980. This technique is extendable to the next state function T of the channel FSM in order to obtain the next state (NST). The length recursion on internal variable x is implementable in terms of FSM as was shown in Rissanen and Langdon, "Compression of Black-White Images With Arithmetic Coding", IEEE Transactions on Communication, Vol. COM-29, June 1981. Further, the channel symbol duration d(a) may be incorporated into a table by way of a look-up indexed on symbol "a", and the previous value of x which also serves as part of the table address. In the embodiment shown in FIGS. 1-3, both the arithmetic expansion and compression units 15,31, used the same length recursion. In generating the RLL (channel) stream, an incremental amount SA, more bits are added by the expansion unit 3 to the RLL string. In this regard, SA constitutes the shift amount. In recreating the data string, SA bits are removed from the RLL string by the compression unit 9.

In a table based FSM implementation of the invention, a table entry of the length recursion would contain the precalculated result of $$(x + d(a)) \cdot N/C = \text{integer} + \text{fraction}$$
$$\qquad\qquad\qquad\qquad (SA) \quad + \quad (NX)$$

Since the values of retained fraction x, and symbol "a" are address inputs for a length recursion table, and since state S and symbol A are also address inputs for the channel FSM function T, a table look-up operation involving only a single table may be used for the combined information access activity.

Referring now to FIG. 4, there is shown an augend memory with channel FSM handling recursion. The values NST and NX are stored in registers. During the recovery of the data string from the channel string, NST and NX serve as the next values of state and x respectively. However, the channel string generation process is one which must locate the channel symbol which "works" so that the NST and NX values from a trial channel set symbol need not become the next state or x value. In this implementation, x, symbol and state are register stored. They are used to access memory 37 whereas the NST, NX, are register output with the values of SA and M respectively placed on paths 43 and 39.

Generation of the RLL Code From a Data Stream

Referring now to FIG. 5, there is shown the data flow for channel string (RLL) generation. A bit string from data buffer 13 is applied to the arithmetic expansion network 15 over path 21. This terminates in shift network 55. The other shifter input is provided by the n bit resultant from subtractor 49 over path 53. Subtractor 49 yields the magnitude difference between the F register contents 45 and the augend M obtained from memory 37 over path 39. Apart from an initial data string fed into F register 45, the contents of the F buffer 47 which hold shifter 55 output are used to supply F register. The channel symbol output is taken to be the borrow signal from subtractor 49 over path 51.

Operationally, register F contains the "working end" of the data string. For augend values of M being 3, 4, or 5, then register F size can be 3 bits. This register is initialized with the leading 3 bits of the data string which causes the channel string to be generated.

To start, expander 15 is set at an initial state, say $s_0$, with an initial retained fraction $x=0$. From the initialized state, the symbol generated, for example, "a" and its duration d(a) will govern the next state and the next retained fraction.

In order to generate the RLL string, there first must be determined the largest augend M(s,x,a) given $s_0$ and $x=0$, which does not exceed the value in the F register. The symbol "a" corresponding to this value of M(s,x,a) is the next channel symbol generated. Reiteratively, the augend of the counterpart channel symbols are examined until the first augend which is too large is identified. As may be recalled, an incrementable register symbol in FIG. 4 is loaded with the second symbol value $a_2$. Recalling that the augend corresponding to the first symbol is always 0, then a counter value of "0" can correspond to the address value corresponding to the second symbol. Values of state s and x, and the symbol specify a table address in FIG. 4. They retrieve $M(1,0,a_2)$ and output it on bus 39 and apply it to the subtrahend input of subtractor 49. The difference between the F register 45 contents and that of M is outputted on path 53 and shifted left in the shift unit 55. The amount of the shift is the value of control field SA also obtained from memory 37 in FIG. 4 and applied to the shifter over path 43. The "fill" bits for the shift are provided by the leading bits of the input bus over path 21. The result of the shift is stored in register 47.

The borrow signal on path 51 controls the outcome of the test subtraction. If M is less than F, the borrow signal is inactive, and no channel (RLL) symbol is generated. The F register, the state register, and x registers remain unchanged by not clocking in a new value. However, the F buffer, NST and NX registers receive new values. The symbol counter is incremented and another magnitude comparison is made.

When some symbol "a" first activates the borrow signal on path 51, then symbol "a-1" is placed on channel path out 14 through a control unit. Also, a next state and next retained fraction for "a-1" are already in registers NST and NX, respectively, having been accessed on the previous cycle. Further, the new value for the F register is obtained from F buffer where it was stored on the previous cycle. There are now new values present in F, state, and x registers. The symbol register is loaded with "0" again, representing "a" and the trial subtraction cycle begins again.

Date String Recovery From the RLL Code String

Referring now to FIG. 6, there is shown the data flow for the data stream recovery from data compression unit 31. The unit includes an adder 59 for combining F register 57 contents with the magnitude on M bus 29. The sum, together with a carry output, is sent out over path 33 to a data out buffer 16. The sum absent the carry is also sent to shifter 61. The shift amount SA from FIG. 4 controls the shift of shifter 61 as well as the output buffer 16.

The working end (right end) of the data string appears in register F. The augend retrieved from the table is added to F through adder 59. The adder output is the sum F+ augend. As mentioned, following the add operation, the output bits are passed to buffer 35. This buffer propogates the carry and manages the variable length field from the bus 33 per control line 43(SA).

(5,12) Constraints and the Next State Function T, Length Recursion and Augend Factor M

Referring now to FIG. 7, there is shown the next state function for the example of the (5,12) RLL code. In this regard, the function is implemented by counter 65. If the incoming channel symbol on path symbol is "0", the counter advances. In contrast, if the incoming channel symbol is "1", the counter resets to state "0". An error occurs if channel symbol "1" is applied to counter 65 in states 0 through 4 or, if a channel symbol 1 is applied to counter 65 when it is in state 12. In this embodiment, if the symbol value is "0", a clear input (not shown) is inactive, and the active transition on the clock input advances the value of the counter. If the symbol value is "1" at the active transition of the clock, the state counter is cleared. The clear input behaves as a "synchronous clear". Four bit counters, for example, with "synchronous clear" are readily available commercially.

The next internal variable x, shift amount SA, next state s and the augend factor M are generated by way of data selectors (multiplexers). For example, the length recursion is exemplified by $SA+NX=X+\frac{1}{3}$. This can be implemented by a modulo 3 counter. Also, corresponding to each value x is a non-0 augend value M. This is shown in Table 3:

TABLE 3

| X | NX | SA | M(x,o) |
|---|----|----|--------|
| 00 | 01 | 0 | 101 |
| 01 | 10 | 0 | 100 |
| 10 | 00 | 1 | 011 |

Referring now to FIG. 8, there is shown an implementation of the next x, shift amount, and augend M driven by the outputs of FIG. 7. The multiplexer (MUX) output value for each MUX 71, 73, and 75 is selected by output x from flip-flop 39. This is fed to all three MUX's. The value of x selects the data as follows: the left most input data is selected by the value 00, the middle input data is selected by the value 01, and right most data value is selected by the value 10. Path block element 77 forces the output to 0 during clock times when the channel FSM transition is obligatory. Consequently, the augend M is value 0. A simple combinational circuit fed by the state counter 69 provides the desired output value which forces the M bus 29/39 to 0.

Representability Analyzed

In a one-state, two-symbol channel, suppose the duration of the first symbol "a" is 2 channel time units and the duration of the second symbol "b" is 1 unit. This corresponds to a run-length limited code with the (0,1) constraints, where symbol "a" stands for "10" and symbol "b" stands for "1". (Allowable channel strings are formed in this case as any string made up of a's and b's, then converting each a to 10 and each b to 1.)

The root of Shannon's determinant equation, which corresponds to the growth factor per channel time unit W, is 1.618, whose log is 0.69. The channel capacity is thus 0.69 information bits per channel unit time. The Shannon probability for "a" is 0.382 and for "b" is 0.618.

Consider a fixed-rate length-based code where a rate $\frac{2}{3} < 0.69 = \log W$ is selected. The retained fraction variable x can thus take on three values: 0, $\frac{1}{3}$ and $\frac{2}{3}$. Since there is a single channel state and two symbols, only three non-zero augend factors M(0,b), M($\frac{1}{3}$,b) and M($\frac{2}{3}$,b) need be determined. For convenience, values M by the numerators 0, 1, and 2 must be indexed such that these factors are denoted M(0,b), M(1,b) and M(2,b) respectively.

EXAMPLE

The augend factors and data strings are represented in binary. Select:

M(0,b)=11.

M(1,b)=10.

M(2,b)=01.

Suppose the initial value of retained fraction x is 0, and string b.a is to be transformed to a data string. For convenience, the binary point is shown two bit positions to the right of the beginning of the data string. The length recursion adds 4/3 for symbol "a", the result of $l(a) \times \frac{2}{3}$; and it adds $\frac{2}{3}$ for symbol "b" since l(b)=1.

TABLE 4

| | Example 1, string b.a | | | |
|---|---|---|---|---|
| initial | string | | E | x |
| (null) | 00. | | 0 | 0 |
| Add M(0,b) | 00.<br>11 | Add $\frac{2}{3}$ | | |
| Add M(2,a) | 11.<br>00.<br>11.00 | Add 4/3 | 0<br><br>2 | $\frac{2}{3}$<br><br>0 |

In the above, continuations of channel string b.a with symbol 'a' will continue to yield data string 11.00 with more 0's to the right. String b.a is actually string a.b+1. To see if there is a gap between b.a and a.b which continuations of a.b cannot fill, in Table 5 below channel string a.b.b.b.b is transformed to a data string.

TABLE 5

| | Example 1, string a.bbbb | | | |
|---|---|---|---|---|
| initial | string | | E | x |
| (null) | 00. | | 0 | 0 |
| Add M(0,a) | 00.<br>00. | Add 4/3 | | |
| Add M(1,b) | 00.0<br>1.0 | Add $\frac{2}{3}$ | 1 | $\frac{1}{3}$ |
| Add M(0,b) | 01.00<br>11 | Add $\frac{2}{3}$ | 2 | 0 |
| Add M(2,b) | 01.11<br>01 | Add $\frac{2}{3}$ | 2 | $\frac{2}{3}$ |
| Add M(1,b) | 10.000<br>10 | Add $\frac{2}{3}$ | 3 | $\frac{1}{3}$ |
| Add M(0,b) | 10.0100<br>11 | Add $\frac{2}{3}$ | 4 | 0 |
| Add M(2,b) | 10.0111<br>01 | Add $\frac{2}{3}$ | 4 | $\frac{1}{3}$ |
| | 10.10000 | | 5 | $\frac{1}{3}$ |

It can be confirmed that the pattern 10.101010 ... 10 ... repeats itself, if the process is continued. The gap is bounded above by F(b.a)=11.0000 and below by F(a.bbbbbbb)=10.101010 .... Thus, data strings such as 10.11 ... or 10.1011 ... are not representable because they all are transformed by $Z^1$ to channel string abbbbb ... which comes out of $Z^2$ as 10.101010 ....

EXAMPLE 2

The following illustrates a method for determining the augend factors. Let the scale factor be 16.

$M(0,b)$ = Round $(16 \cdot 2^{-0} \cdot .382 = 6.112) = 6.$ (110)
$M(1,b)$ = Round $(16 \cdot 2^{-\frac{1}{3}} \cdot .382 = 4.864) = 5.$ (101)
$M(2,b)$ = Round $(16 \cdot 2^{-\frac{2}{3}} \cdot .382 = 3.86) = 4.$ (100)

To apply the consistency test, the values $M(,b+1)$ are needed:

$M(0,b+1)$ = Round $(16 \cdot 2^{-0/3} \cdot 1.0 = 16.0) = 16.$
$M(1,b+1)$ = Round $(16 \cdot 2^{-\frac{1}{3}} \cdot 1.0 = 12.7) = 13.$
$M(2,b+1)$ = Round $(16 \cdot 2^{-\frac{2}{3}} \cdot 1.0 = 10.1) = 10.$ Test 1: $x = 0$, $x = l(a) = 1, \frac{1}{3}$.
$M(0,b)M(0,a) \leq M(1,b+1) \times \frac{1}{2}$
$6 \leq 13/2 = 6.5$ OK Test 2: $x = \frac{1}{3}$, $x + l(a) = 1, \frac{2}{3}$.
$M(1,b)M(1,a) \leq M(2,b+1) \times \frac{1}{2}$
$5 \leq 10/2 = 5$ OK Test 3: $x \frac{2}{3}$, $x + l(a) = 2, 0/3$.
$M(2,b)M(2,a) \leq M(0,b+1) \times \frac{1}{4}$
$4 \leq 16/4 = 4$ OK The consistency test is satisfied, and a test such as Tables 4 and 5 reveals that no gaps are left in the data strings for augend factors 6, 5, and 4.

It is to be understood that the particular embodiment of the invention described above and shown in the drawings is merely illustrative and not restrictive of the broad invention. For example, a probability based FIFO arithmetic code which does not leave a data gap going from the RLL string to a data string can conceivably be used for the transformation $Z^1$ and $Z^2$ shown in FIG. 1. One such code which satisfies the requirement is reported by Martin in the context of compression coding. This code also satisfies the representability requirement as it does not leave any data gap in the mapping from the RLL string to the data string. The prior art compression method of Martin directly uses fixed precision approximations to the probabilities. For the channel FSM, the Shannon probabilities are employed. Various changes in design structure and arrangement may be made without departure from the spirit of the broader aspects of the invention as defined in the appended claims.

I claim:

1. A method for maintaining representability of symbol strings in the conversion of data strings into fixed rate run length limited (RLL) symbol strings and vis-a-vis, characterized in that the method comprises the steps of:
   mapping of each data string into an RLL string by serially applying the data strings to a length oriented arithmetic decoder constrained to ensure a ONE-TO-ONE transformation; and
   mapping of each RLL string into a data string by serially applying the RLL string to a length oriented arithmetic encoder constrained to ensure an ONTO transformation.

2. An apparatus for generating fixed rate run length limited (RLL) symbol strings from data strings, characterized in that the apparatus comprises:
   register means (17,45) for storing a bit string segment;
   a finite state machine (17) responsive to consecutive RLL symbols for providing a trial augend and a shift amount indicative of the length attribute of a previously encoded data string symbol;
   a subtractor (49) for ascertaining the magnitude difference between the register contents and the augend;
   means (21,55,43 and 37) during each encoding cycle for relatively shifting the difference magnitude contents from the subtractor and a data string symbol into the register by the shift amount; and
   means (control unit 51) for generating an RLL symbol only when the trial augend is greater than the register contents.

3. An apparatus for generating a data string from a fixed rate RLL code string, characterized in that the apparatus comprises
   a multiple bit register (57);
   a finite state machine responsive to successive RLL string symbols for generating an augend (29) and a shift amount;
   an adder for arithmetically combining the register contents with the augend; and
   means (61,43,63) during each encoding cycle for shifting a predetermined length of the data string adder output into the register as designated by the shift amount.

* * * * *